United States Patent [19]

Ricci

[11] Patent Number: 5,685,996

[45] Date of Patent: Nov. 11, 1997

[54] PLASMA ARC PIPE CUTTING APPARATUS

[76] Inventor: Donato L. Ricci, W8477 - 162nd Ave., Hager City, Wis. 54014

[21] Appl. No.: 650,444

[22] Filed: May 20, 1996

[51] Int. Cl.$^6$ ............................................. B23K 10/00
[52] U.S. Cl. .................... 219/121.39; 219/121.58; 219/159; 219/59.1; 219/60 A; 219/121.44
[58] Field of Search .................. 219/60 A, 59.1, 219/121.39, 121.44, 121.59, 121.58, 158–160, 121.67

[56] References Cited

U.S. PATENT DOCUMENTS

| | | | |
|---|---|---|---|
| 4,009,360 | 2/1977 | Beetham | 219/60 A |
| 4,218,006 | 8/1980 | Atrepiev et al. | 219/60 A |
| 4,434,348 | 2/1984 | Reid | 219/61 |
| 4,739,685 | 4/1988 | Ricci . | |
| 4,896,812 | 1/1990 | Kazlauskas | 228/32 |
| 4,939,964 | 7/1990 | Ricci . | |
| 5,006,687 | 4/1991 | Fujita et al. | 219/121.59 |

OTHER PUBLICATIONS

Miller Electric Mfg Co., Spectrum Series Air Plasma Cutting Systems, Index No. PC/4.0, Jul. 1995.

*Primary Examiner*—Mark H. Paschall
*Attorney, Agent, or Firm*—Haugen and Nikolai, P.A.

[57] ABSTRACT

A plasma arc pipe cutting apparatus incorporates a plasma arc torch adjustably coupled to a motor-driven ring which transports the torch in an orbit about the pipe to be cut. The apparatus includes a pipe clamping fixture allowing the pipe to be cut to be concentrically mounted within the ring so that the gap between the electrode of the plasma arc torch and the work piece remains constant through the orbital travel of the torch.

13 Claims, 5 Drawing Sheets

PLASMA ARC PIPE CUTTING APPARATUS

BACKGROUND OF THE INVENTION

I. Field of the Invention

This invention relates generally to a machine and method for cutting off segments of predetermined lengths from a continuous tubular pipe and in particular to a machine incorporating a plasma arc cutting torch as the cutting instrument.

II. Discussion of the Prior Art

Metal pipes are commonly formed in an extrusion process that yields pipes that may range in diameter from as little as 6 inches to as much as 30 inches and may be formed in lengths of 20 feet or more. A need often exists in industry to provide shorter length pipe segments cut to a desired size from the raw stock of mild steel, stainless steel and aluminum pipes. In the past, the common practice has been to clamp the pipe to be cut in a holding fixture and then use a band saw to cut transversely through the pipe as the pipe is moved relative to the saw blade. Where large diameter pipes are involved, the unsupported length of band saw blade between its upper arm and lower table may result in an irregular wavy cut requiring further machining steps.

In my earlier U.S. Pat. Nos. 4,739,685 and 4,939,964 and in my pending application Ser. No. 08/380,105, filed Jan. 30, 1995, there are described clamshell pipe cutting tools in which a rotatable ring is journaled for rotation about a stationary ring where the pipe to be cut is centrally disposed within the two rings. A tool holder mounted on the rotatable ring is equipped with a mechanical cutting tool that is incrementally advanced into the wall of the tube being cut upon each orbital rotation of the movable ring about the pipe. Many rotations of the ring and attached cutting tool are required before the blade is able to penetrate completely through the wall of the pipe being cut.

Therefore, a need exists for a tool that can be employed to cut off predetermined length segments from a steel or aluminum pipe that produces regular lengths without need for further machining and where the pipe can be cut off substantially faster than has been possible using a band saw or a clamshell lathe of the type described in my earlier patents referenced above.

SUMMARY OF THE INVENTION

In accordance with the present invention, I provide a method for circumferentially cutting segments from a tubular metal pipe that includes the steps of mounting a plasma arc cutting torch on a ring that is journaled for rotation about a center line that extends perpendicularly to a plane containing the ring. The pipe to be cut is concentrically located within the I.D. of the ring and the plasma arc cutting torch is directed at an exterior wall of the pipe to be cut. With the arc ignited, the ring is made to rotate about the center line through a predetermined angle slightly in excess of 360° and at a predetermined speed sufficient to allow penetration of the plasma arc through the exterior wall of the pipe to be cut as the torch orbits the pipe.

The foregoing method is best practiced using the apparatus of the present invention. Specifically, the apparatus includes a stand having a base and a pair of support members that extend upward from the base. A first ring member, having an inner diameter greater than the outer diameter of the pipe to be cut, is supported on movable slides mounted on the upright members. A second ring member having an inner diameter greater than the outer diameter of the pipe to be cut is journaled to the first ring member for rotation in a plane that is parallel to that of the first ring member. A plasma arc cutting torch is affixed to and rotatable with the second ring member. The apparatus further includes a vise or clamping structure for supporting and clamping the pipe to be cut concentrically within the first and second ring members. When a drive motor, operatively coupled to the rotatable ring member, is activated, the rotatable ring leaves its home position and rotates through a predetermined angle in excess of 360° while the plasma arc from the torch burns through the wall of the pipe. The control for the apparatus first ignites the plasma arc and then detects the penetration of the plasma arc through the wall of the pipe to be cut. Upon detecting the burn-through, it triggers the drive means to effect orbital movement of the cutting torch and after it has traversed 360° of arc, the cutting torch is extinguished and the direction of the drive means is manually or automatically reversed, allowing the gas supply hoses and electric wires to unwind as the cutting torch moves back to its original home position.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
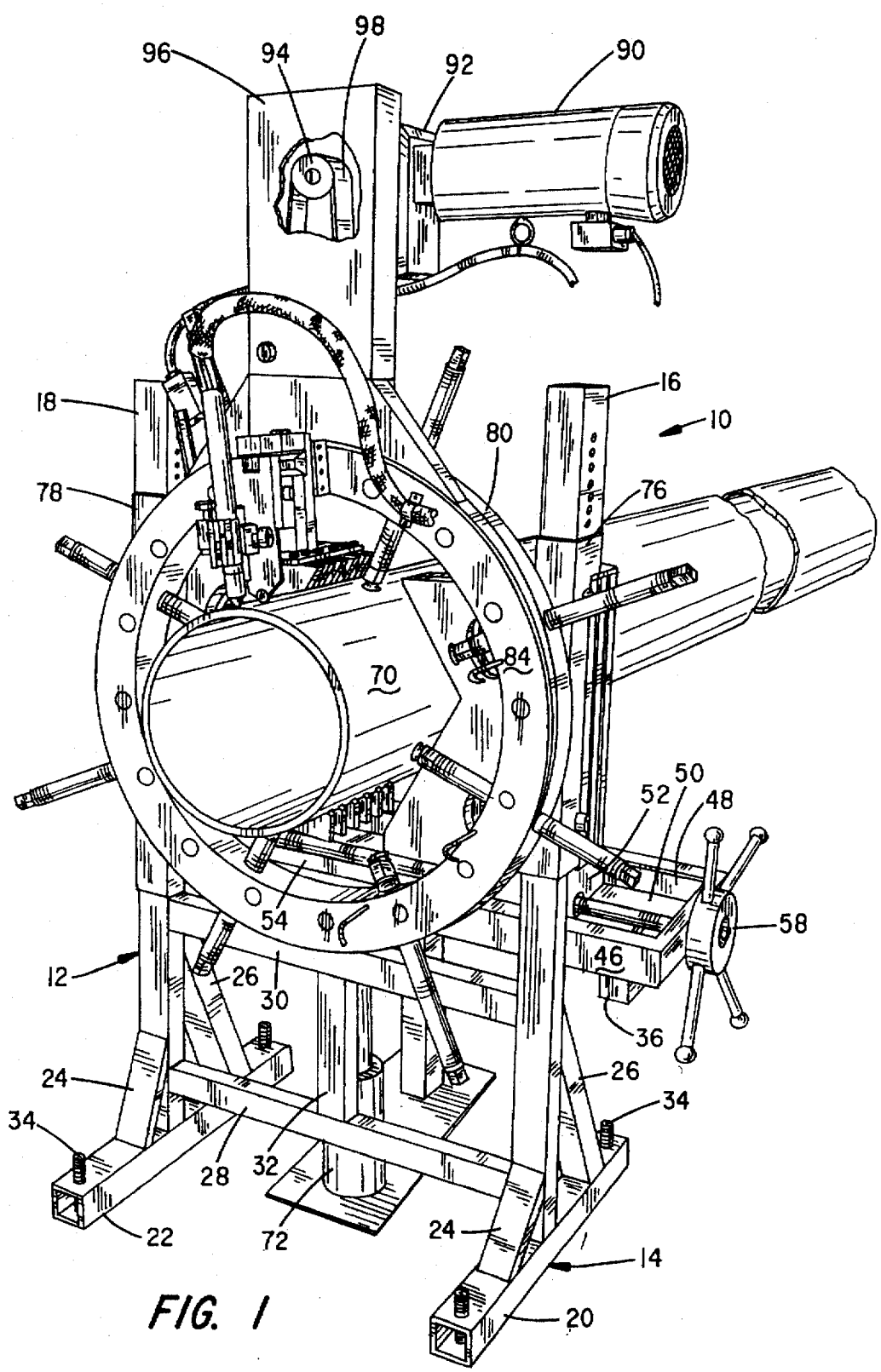
FIG. 1 is a front perspective view of the plasma arc pipe cutting apparatus of the present invention.
Figure 2:
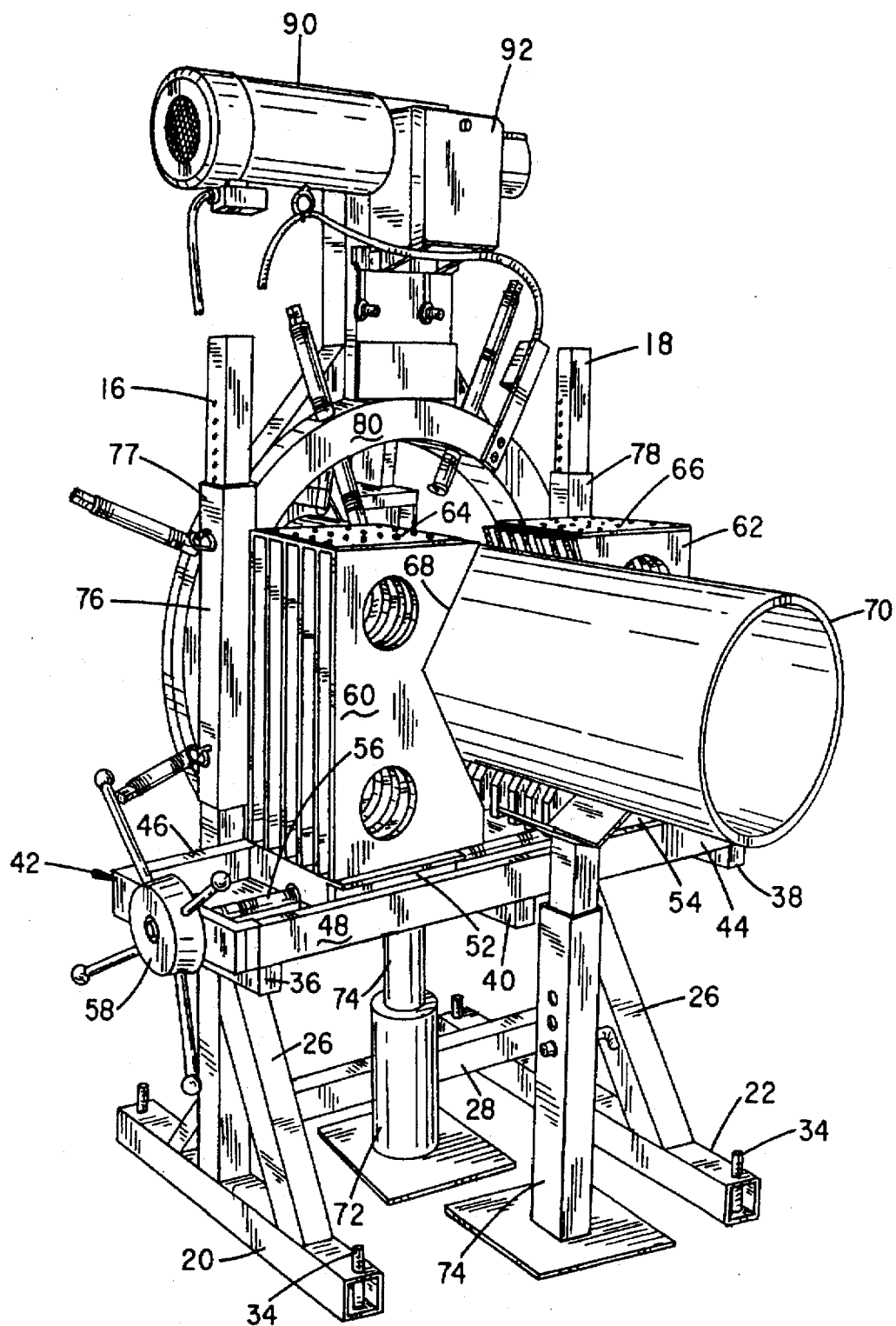
FIG. 2 is a rear perspective view of the apparatus of FIG. 1.

With reference to FIGS. 1 and 2, the plasma arc pipe cutting apparatus is indicated generally by numeral 10 and is seen to include a stand 12 having a base 14 supporting upright posts 16 and 18. The base 14 includes foot members 20 and 22 each comprising steel tubes of rectangular cross-section. The uprights posts 16 and 18 are welded to the foot members 20 and 22 and reinforcing gussets 24 and 26 are welded both to the foot members and to the vertical posts. The stand 12 further includes cross members 28 and 30 that are welded, bolted or otherwise affixed at opposed ends to the uprights posts 16 and 18 and a vertical stud 32 is placed between the cross members 28 and 30 approximately midway along the length thereof. To provide leveling of the stand, jack pads as at 34 are located at opposed ends of the foot members 20 and 22.

As is best seen in FIG. 2, welded to the outer side surfaces of the posts 16 and 18 and atop the cross member 30 are support brackets 36, 38 and 40 also formed from rectangular tubing and whose upper surfaces reside in a generally horizontal plane. The support brackets 36, 38 and 40 provide support for a vise-like pipe clamping assembly 42. The assembly 42 includes a stationary base member 44 having front and rear upright edges 46 and 48, respectively, and a central portion of reduced thickness 50. The tray-like base 44 is designed to contain first and second movable clamping bases 52 and 54. While not shown in the drawings, the clamping base 52 has a recess in the underside thereof for receiving a right-hand threaded nut. Likewise, the clamping base 55 has a recess in the underside thereof for receiving a left-hand threaded nut. Fitted into a longitudinal bore formed in the movable clamp bases 52 and 54 and cooperating with the right-hand threaded and left-hand threaded nuts (not shown) is a lead screw 56. The lead screw 56 is effectively divided into two halves having left-hand threads on one end and right-hand threads on the other. Thus, when the handle 58 attached to the end of the lead screw is rotated, the movable clamp bases 52 and 54 will be made to slide in the stationary base member 44 toward or away from one another, depending upon the direction of rotation of the handle 58.

The movable clamp bases 52 and 54 each include a plurality of parallel, spaced-apart grooves into which are fitted jaw plates as at 60 and 62. The jaw plates are capped by top members 64 and 66 which are bolted or otherwise affixed to the individual jaw plates 60 and 62 to maintain them in their parallel, spaced-apart orientation. As is best seen in the rear perspective view of FIG. 2, the jaw plates 60 and 62 each include an angled notch as at 68 adapted to close upon a tubular work piece, such as is illustrated by the pipe 70. Because of the manner in which the jaw plates are notched, the pipe 70 tends to center itself between the jaws as they are made to close by appropriate rotation of the handle 58.

Positioned beneath the pipe clamp base 42 is a hydraulic jack 72 whose piston 74 cooperates with the underside of the stationary clamp base member 44, allowing it to be raised and lowered. Illustrated in FIG. 2, but not forming any part of the present invention, is a jack stand 74 which may be used to provide support, if necessary, to the portion of the pipe 70 cantilevered off the end of an infeed conveyor (not shown).

Figure 4:
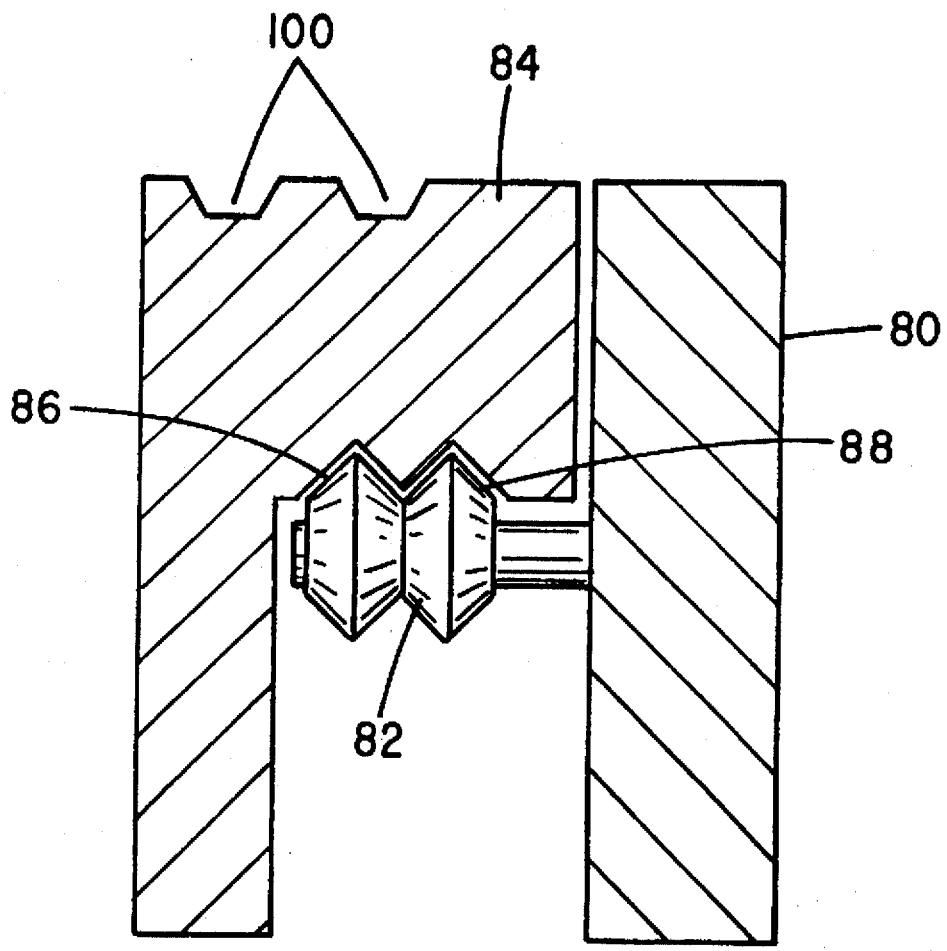
FIG. 4 is a cross-sectional view taken through the stationary and movable rings showing the manner in which the movable ring is journaled for rotation.

With continued reference to FIGS. 1 and 2, it can be seen that fitted over the posts 16 and 18 and slidable therealong are tubular mounting brackets 76 and 78 of rectangular cross-section. The brackets 76 and 78 can be selectively positioned at a desired height and then held in place by inserting a pin through a hole in the bracket that is aligned with one of a series of holes in the posts, as at 77 in FIG. 2. The mounting brackets support a first, stationary ring member 80. The inside diameter of the stationary ring 80 is substantially larger than the outside diameter of a pipe 70 to be cut, such that the pipe can be readily made to fit through the central opening of the stationary ring member. Journaled for rotation relative to the stationary ring member is a movable ring member 84. More particularly, as can be seen from the cross-sectional view of FIG. 4, the stationary ring member 80 supports a plurality of roller bearings 82 which are regularly circumferentially spaced on the stationary ring member 80 in a manner described in my copending patent application referenced in the above "Discussion of the Prior Art". The movable ring member 84 has a bearing race 86 formed on an internal annular surface 88 such that the movable ring 84 is free to rotate in a plane parallel to the stationary ring 80.

The motive force for rotating the movable ring 84 is provided by an electric motor 90 which is coupled through a gear reduction box 92 to a V-belt drive pulley 94 contained within a protective shroud 96. A V-belt 98 deployed about the drive pulley 94 and covered by the shroud 96. The V-belt extends around the movable ring and rides in belt grooves 100 formed in the periphery of the rotatable ring 84.

Figure 3:
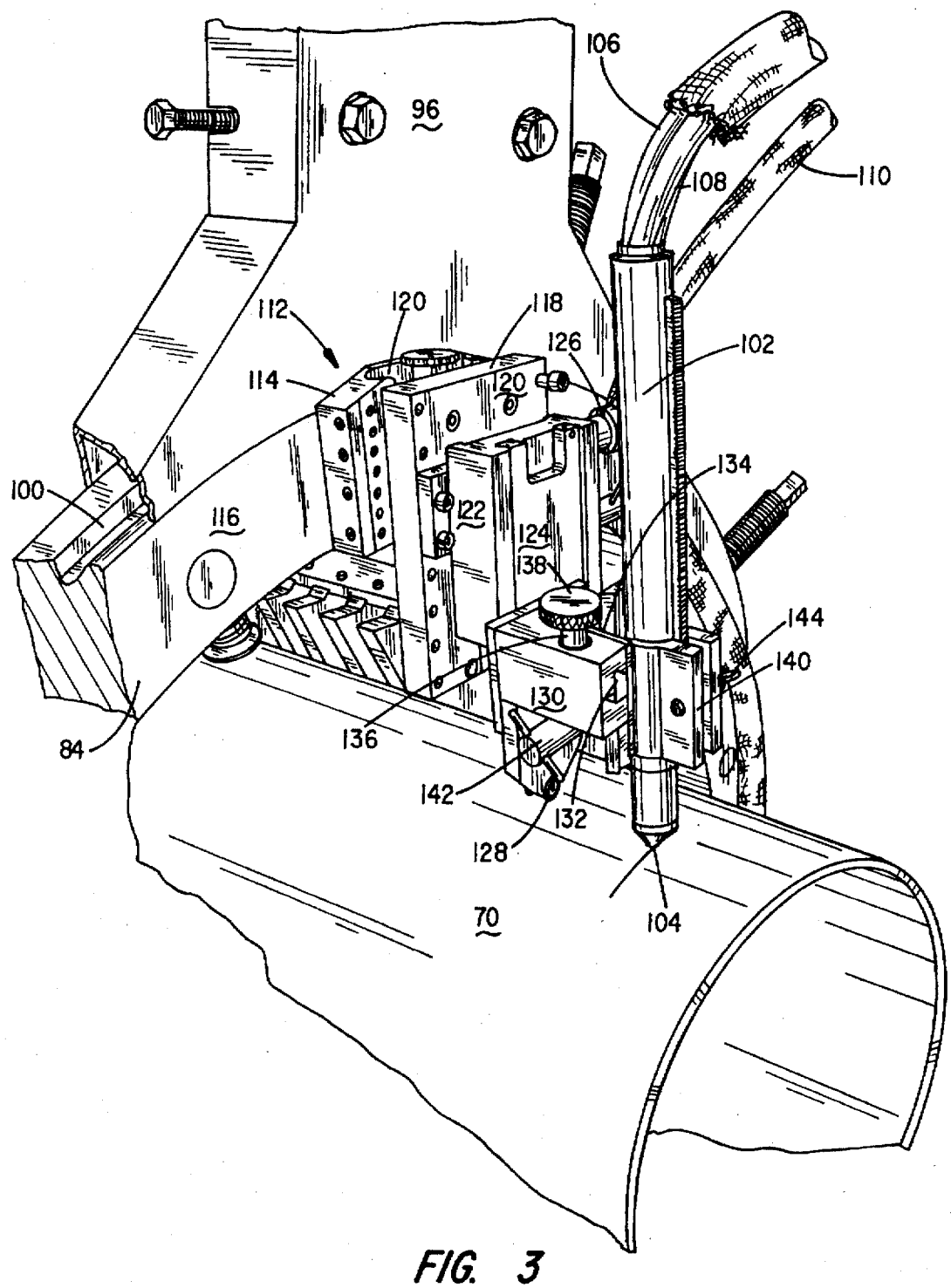
FIG. 3 is an enlarged fragmentary view illustrating the manner in which the plasma arc torch is supported relative to the rotatable ring member.

Next, with reference to the enlarged partial view of FIG. 3, there is shown a plasma arc cutting torch 102 having a nozzle 104 at a lower end thereof. Without limitation, the torch itself may be of the type manufactured and sold by the Miller Electric Machine Company of Appleton, Wisc. The cutting torch 102 is supplied with one or more gases, via tubes 106 and 108, and with an electrical current via cable 110. The gas tubes and electrical cable connect to a power supply console, such as a Model Spectrum 1250 also sold by Miller Electric Machine Company. As those skilled in the art appreciate, the gas along with a pilot spark maintained between an electrode in the tip of the torch and the workpiece combine to provide the high energy plasma arc capable of burning through steel and/or aluminum. As such, it is necessary to maintain an appropriate close spacing between the tip of the torch and the workpiece so that the arc can be maintained. For this purpose, there is affixed to the movable ring 84 a torch positioning mechanism indicated generally by numeral 112. The assembly 112 includes a steel spacer plate 114 that is bolted to the exterior vertical face 116 of the movable ring 84 and attached to it is a spring-loaded guide member 118 having a dove-tail projection (not shown) on the front face 120 thereof and this dove-tail projection fits into a corresponding dove-tail groove of a spring base member 122. Operatively disposed between the projection on the member 118 and a shelf surface (not shown) milled into the rear face of the spring base member 122 is a compression spring (not shown) that normally urges or biases the spring base 122 toward the workpiece 70.

A further dove-tail groove is formed vertically in the spring base member 122 for receiving a follower slide 124 therein. The follower slide includes a longitudinally extending rectangular groove (not shown) on the rear face thereof and fitted into this groove is a gear rack (not shown) that cooperates with a pinion gear that is manually rotatable by a knurled knob 126 to raise and lower the follower slide 124. Affixed to the lower end of the follower slide 124 and journaled for rotation thereon is a roller 128 designed to ride along the exterior surface of the workpiece 70.

Attached to the front face of the follower slide 124 is an additional adjustment mechanism including a right angle slide block 130 having a generally horizontally extending dove-tail groove 132 for receiving a dove-tail projection on a slide plate 134. Affixed to the dove-tail projection of the slide plate 134 is a gear rack (not shown) that meshes with a pinion gear that is secured to the end of the shaft 136. The shaft 136 is adapted to be manually turned using the knurled knob 138. Rotation of the knob 138 effects generally horizontal movement of the slide plate 134 within the slide block 130 and is used to accurately align the cutting torch tip with a measured location on the pipe to be cut.

Visible in FIG. 3 is a torch holder 140 in the form of a U-shaped clamp having a cylindrical bore for receiving the cylindrical body of the torch 102. The U-shaped clamp is pivotally secured to the slide plate 134 by means of a thumb screw 142 allowing the torch 102 to be tipped at an angle with respect to the vertical in a range from 0° to about 38°. Likewise, a thumb screw 144 passing through the legs of the U-shaped torch holder 140 can be loosened to permit course vertical adjustment of the torch 102 relative to the workpiece.

Having discussed the constructional features of a preferred embodiment of the invention, consideration will next be given to its mode of operation.

Operation

In initially setting up the plasma arc pipe cutting system of the present invention, the stand 12 having the ring assembly 84 affixed to it is positioned in front of a conveyor (not shown) on which an elongated pipe 70, which is to be cut into segments of predetermined lengths, is disposed. The hydraulic jack 72 is then used to displace the ring assembly 74 and the pipe clamping assembly in the vertical direction of the pins 77 have been pulled out of the mounting brackets 76 and 78 which are then free to slide along vertical posits 16 and 18 of the stand. The ring assembly is thus moved to the point where the pipe 70 can be made to pass through and be roughly centered in the central opening of the movable ring 84 before being pinned in place using pins as at 77 in FIG. 2. To precisely concentrically center the pipe 70 within the movable ring 84, the operator will rotate the handle member 58 to cause the jaws 60 and 62 of the pipe clamping assembly to come together against the outer wall of the pipe 70. Because of the manner in which the jaw plates 60 and 62 are notched, a centering action takes place in a horizontal direction.

Next, the knob 126 on the torch positioning assembly 112 is rotated to bring the roller 128 into contact with the outer wall of the pipe 70 and the knob 138 is adjusted to longitudinally position the cutting torch 102, and especially its working tip 104 at the location on the pipe where the cut is to be made.

The set-up is now complete.

Figure 5:
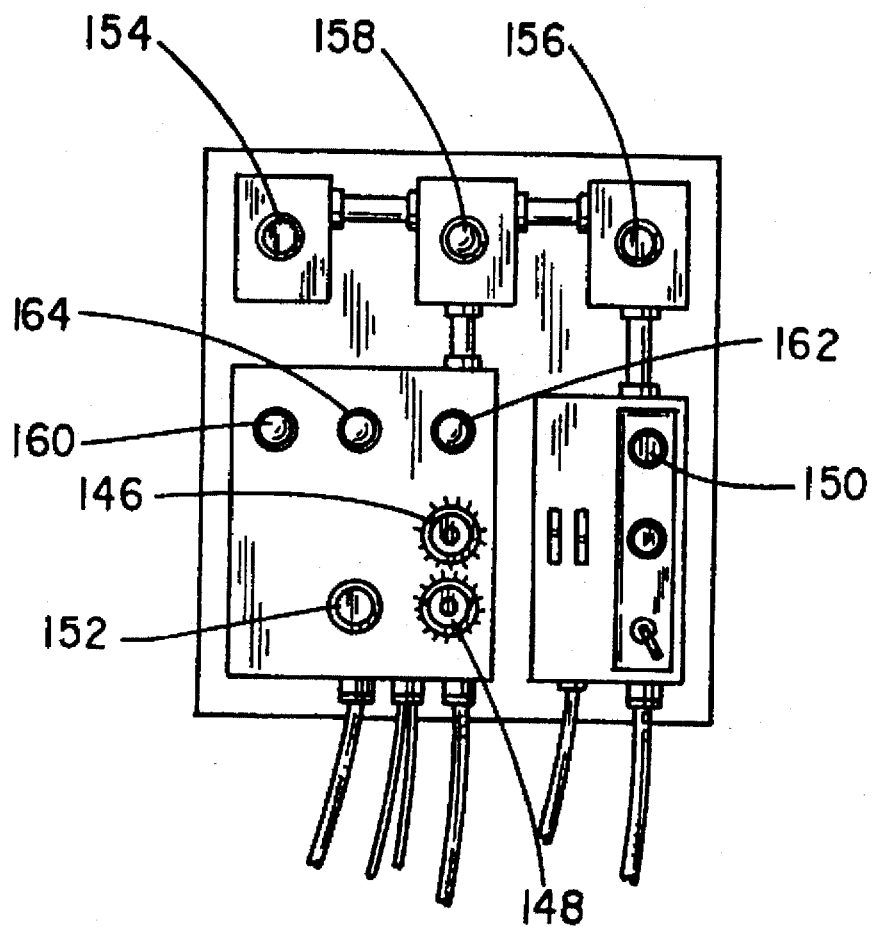
FIG. 5 is a drawing of the control panel used with the system of the present invention.

To effect cutting, the operator will next turn on a gas supply which delivers selected gases through the tubes 106 and 108 which pass through the torch 102 to the tip area 104. With reference to the control panel drawing of FIG. 5, the operator will first rotate a "Start Power" knob 146 to a low current duty cycle in the range of from 0 to 40 percent which is sufficient to cause an igniting spark to be generated between the torch's electrode and the work piece to be cut. At this time, the operator will also set the "Run Power" dial to a second current setting higher than the first and sufficient to maintain the plasma discharge during the cutting operation. Next, the operator will set the "Travel Speed" dial to a desired speed which may range between five inches per minute and 130 inches per minute, depending on pipe diameter, pipe wall thickness, material and the gas settings.

Before the cutting operation can proceed, the operator must first lift up the "Emergency Stop" button 152 and then simultaneously depress the two "Start" buttons 154 and 156 simultaneously, thus insuring that the operator's hands are not in a position where injury could occur. Pressing the "Start" buttons will result in the plasma arc being initiated. The control console senses current changes resulting when the plasma arc penetrates through the wall of the pipe and this sensed event is used to automatically turn on the motor 90 to drive the movable ring 84 in a first direction and at a predetermined speed set by dial 150 so that the plasma arc continuously cuts through the wall of the pipe along a circumferential line. Any eccentricity in the circumferential dimensions of the pipe or any slight offset between the centerline of the pipe being cut and the rotatable ring gear can be accommodate by virtue of the fact that the spring biased slide block 122 allows the follower roller 128 to rise and fall with out-of-round variations in the pipe. The controller is designed to shut off the motor upon completion of a rotation of the movable ring 84 through a predetermined angle slightly in excess of 360°. As such, the segment of pipe of the desired length is severed from the remainder of the pipe.

As the torch 102 carried by the movable ring 84 orbits the pipe, the gas feed tubes 106 and 108 and the electrical cable 110 tend to wrap about the pipe. Upon completion of the cut, depression of the "Return" button 158 causes the motor to be driven in the opposite direction through a 360° angle and stop to thereby allow the gas tubes and cable to unwind in anticipation of a subsequent cutting operation. The indicator lights 160 and 162 respectively indicate when the cutting torch is rotating in the forward or return direction. The indicator light 164 becomes illuminated whenever the "Emergency Stop" push-button 152 has been depressed, indicating that a reset procedure must be followed before cutting can be reinitiated.

The fact that the torch clamping mechanism 140 can be pivoted from the vertical by first loosening the thumb screw 142, tilting the torch and then retightening the thumb screw, allows a beveled cut of a desired angle to be made.

The cutting speed is, of course, a function of the wall thickness of the pipe and the current supplied to the torch.

Using the system of the present invention, it is possible to cut off a 20" diameter pipe having a wall thickness of ⅜" in only 12 seconds. This is to be compared with the 45 minutes required to do same job when using a bandsaw or appropriately 40 minutes when using the system of my earlier U.S. Pat. No. 4,739,685.

Thus, it can be seen that there is provided an apparatus and method for cutting pipe that is superior to known prior art techniques. It will be understood that while the invention has been described specifically with reference to a single embodiment, various changes and modifications may be made to it which fall within the full and intended scope of the appended claims.

I claim:

1. An apparatus for circumferentially cutting metal pipes of a predetermined outer diameter and wall thickness to desired lengths, comprising:
   (a) a stand having a base and a pair of support members extending upwards from said base;
   (b) a first ring member having an inner diameter greater than the predetermined outer diameter of a pipe to be cut, the first ring member being coupled to the pair of upright members;
   (c) a second ring member having an inner diameter greater than the outer diameter of the pipe to be cut;
   (d) means for journaling the second ring member to the first ring member for rotation in a plane parallel to the first ring member;
   (e) a plasma arc cutting torch affixed to and rotatable with the second ring member;
   (f) means adapted to concentrically support the pipe to be cut within a central opening of the first and second ring members;
   (g) drive means affixed to the first ring member and coupled in driving relation to the second ring member; and
   (h) control means synchronized with the drive means for controlling the ignition and extinguishing of the plasma arc cutting torch and including means responsive to the plasma arc cutting torch penetrating through the wall of the pipe to be cut for energizing the drive means, and means responsive to the rotation of the plasma arc cutting torch through a predetermined angle in excess of 360° for extinguishing the cutting torch and reversing the drive means.

2. The apparatus as in claim 1 wherein the means for concentrically supporting the pipe comprises:

(a) a vise having first and second movable jaws operatively coupled to a rotatable lead screw, the jaws having cooperating faces shaped to center a pipe to be cut placed therebetween; and (b) means for raising and lowering the vise relative to said stand.

3. The apparatus as in claim 1 wherein the first and second ring members can be raised and lowered along the pair of uprights.

4. The apparatus as in claim 1 wherein the plasma cutting torch is affixed to the second ring member by a tool holder.

5. The apparatus as in claim 2 wherein the means for raising and lowering the vise is a hydraulic jack.

6. The apparatus as in claim 1 wherein the tool holder includes follower means cooperating with an outer surface of the wall of the pipe to be cut for maintaining a predetermined gap between the plasma arc cutting torch and the outer surface of the pipe to be cut, irrespective of variations in concentricity of the pipe to be cut with respect to the first and second ring members.

7. A method for circumferentially cutting off segments from a tubular pipe, comprising the steps of:

(a) mounting a plasma arc cutting torch on an annular ring that is journaled for rotation about a center line extending perpendicular to a plane containing said annular ring;

(b) concentrically locating the pipe to be cut within the annular ring;

(c) directing the plasma arc cutting torch at an exterior wall of the pipe to be cut; and (d) initiating rotation of said annular ring about said center line through a predetermined angle of at least 360° upon penetration of a plasma arc from the plasma arc cutting torch through the exterior wall of the pipe to be cut; and at a predetermined speed sufficient to allow continued penetration of a plasma arc produced by the plasma arc cutting torch through the exterior wall of the pipe to be cut; and (e) reversing the direction of rotation and extinguishing the cutting torch when the annular ring completes rotation through the predetermined angle.

8. The method as in claim 7 wherein the step of concentrically locating the pipe to be cut within the ring includes:

(a) clamping the pipe to be cut in a vise; and (b) moving the vise with respect to the annular ring until a center line of the pipe is coincident with the center line of the annular ring.

9. An apparatus for circumferentially cutting metal pipes of a predetermined outer diameter and wall thickness to desired lengths, comprising:

(a) a stand having a base and a pair of support members extending upwards from said base;

(b) a first ring member having an inner diameter greater than the predetermined outer diameter of a pipe to be cut, the first ring member being coupled to the pair of upright members;

(c) a second ring member having an inner diameter greater than the outer diameter of the pipe to be cut;

(d) means for journaling the second ring member to the first ring member for rotation in a plane parallel to the first ring member;

(e) a plasma arc cutting torch affixed to and rotatable with the second ring member;

(f) means adapted to concentrically support the pipe to be cut within a central opening of the first and second ring members;

(g) drive means affixed to the first ring member and coupled in driving relation to the second ring member; and (h) control means synchronized with the drive means and responsive to a plasma arc of the plasma arc cutting torch penetrating through the wall of the pipe to be cut for energizing the drive means.

10. The apparatus as in claim 9 wherein the tool holder includes follower means cooperating with an outer surface of the wall of the pipe to be cut for maintaining a predetermined gap between the plasma arc cutting torch and the outer surface of the pipe to be cut, irrespective of variations in concentricity of the pipe to be cut with respect to the first and second ring members.

11. The apparatus as in claim 9 wherein the means for concentrically supporting the pipe comprises:

(a) a vise having first and second movable jaws operatively coupled to a rotatable lead screw, the jaws having cooperating faces shaped to center a pipe to be cut placed therebetween; and (b) means for raising and lowering the vise relative to said stand.

12. The apparatus as in claim 9 wherein the first and second ring members can be raised and lowered along the pair of uprights.

13. The apparatus as in claim 9 wherein the plasma cutting torch is affixed to the second ring member by a tool holder.

* * * * *